United States Patent [19]

Berger

[11] Patent Number: 4,634,256
[45] Date of Patent: Jan. 6, 1987

[54] PICTURE TAKING ASSEMBLY FOR COPIER APPARATUS

[75] Inventor: Jean-Claude Berger, Issoudun, France

[73] Assignee: Tetras, St. Denis, France

[21] Appl. No.: 734,812

[22] Filed: May 16, 1985

[30] Foreign Application Priority Data

May 16, 1984 [FR] France .................................. 84 07563

[51] Int. Cl.[4] ............................................ G03B 27/00
[52] U.S. Cl. ........................................................ 355/1
[58] Field of Search ............................................. 355/1

[56] References Cited

U.S. PATENT DOCUMENTS

| 4,084,895 | 4/1978 | Ogawa et al. | 355/1 |
| 4,194,827 | 3/1980 | Bleeker et al. | 355/1 |
| 4,370,055 | 1/1983 | Nishikawa et al. | 355/1 |

Primary Examiner—Monroe H. Hayes
Attorney, Agent, or Firm—Mason, Fenwick & Lawrence

[57] ABSTRACT

Assembly for taking pictures in copiers comprising illuminating tubes, an optics and devices for driving in translational movement the original document in sheets for taking picture, line by line, wherein a light-proof housing disposed in the body of the copier comprises in the center, an assembly of optical fibres disposed along the length of the line, and on each side, an illuminating tubular assembly and a driving roller.

3 Claims, 1 Drawing Figure

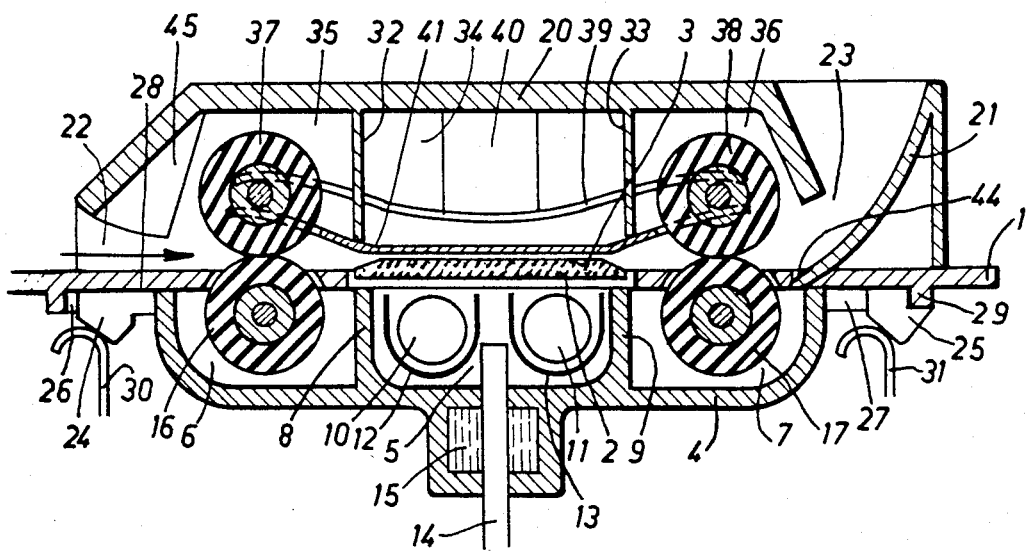

PICTURE TAKING ASSEMBLY FOR COPIER APPARATUS

BACKGROUND OF THE INVENTION

1. Field of the Invention

The object of the present invention is a picture taking assembly for copier apparatus or copiers. It applies to all types of copiers in which the image of the original document is transferred onto a support that can be either the support of the copy (a photosensitive paper, for example), or an intermediary support (a photoreceptor in electrostatic copy, for example). Furthermore, it applies in all cases where the line by line reading of an original document results in the line by line reception on the said receptor support.

The term "line" is in the present specification to be considered as the geometric term and not with the meaning of a written or printed line of text.

The aim of the present invention is to produce a simple, compact and inexpensive picture taking assembly, while presenting good reliability and flexibility of utilization. Furthermore, the aim of said invention, while being oriented towards the reproduction of original documents in single, detached sheets, is to allow an easy adaptation to other forms of original documents, especially original documents of assembled, or even bound sheets.

2. Summary of the prior art

The prior art discloses numerous picture taking assemblies for copiers in which, either the original document is fixed and the optics is displaced to ensure the sweeping, or the original document is displaced and the optics remains fixed, the support receiving the image being most frequently movable.

The present invention does not include cases of photography or equivalent where the image of the original document is transferred in its entirety and not line by line.

The present invention can be applied in the line by line copy of an original document in translation movement with a line by line receptor on a support which (as has been described herein above) can be intermediary or ultimate.

The drawback of systems with objectives according to the prior art becomes apparent from the large space required for the length of the displacement between the objective and the original document, then between the objective and the image support, this length being in function of the focussing length of the objective, and of the dimensions of its pupils and the width of the lines, i.e. its field aperture.

Furthermore, an objective can contribute distorsions if it is not of a high quality. Therefore, copiers exist having objectives in which the luminous beam describes complicated paths due to the use of mirrors or reflecting prisms to limit the bulk of the assembly, thereby provoking instances of poor adjustment.

Furthermore, the majority of devices according to the prior art in which the original document is displaced by a translation movement utilize carriages having an alternate movement, thereby prohibiting a low retail price and especially preventing reduced space-consumption, the carriage being caused to project considerably at each of its travel ends, well beyond the length of the copier per se.

SUMMARY OF THE INVENTION

The present invention overcomes these various problems due to a simple and compact device, this device comprising a light-proof housing disposed within the body of the copier, which comprises, in the centre, an assembly of optical fibres disposed along the length of the picture taking line, and, on each side, on the one hand, a tubular lighting assembly and, on the other hand, a driving roller. The device according to the present invention utilizes under a particularly reduced volume, a housing or station ensuring both the illumination of the original document and the transmission of the lines image through film optics, this disposition allowing the easy driving in translational movement of the original document and a simple changing of the original type of document.

Furthermore, integrated within this illumination housing, driving devices for the original document co-operate with a removable bridge that is fixed against the assembly of the illuminating housing and presents guiding and maintenance devices for the original document and driving elements cooperating with said devices of the illuminating housing. The removal of the bridge allows easy servicing and a disengagement of the original document in case of unforeseen incident. It also allows to pass an original document that is not a single sheet but, for example, an assembly of stapled sheets, even bound sheets, such as magazines or revues, for example.

Furthermore, the utilization of illumination devices having a generally cylindrical form allows their removal through sliding by one of their ends and their simple replacement without dismantling the housing or the bridge.

According to one embodiment of the invention, these illuminating devices are, preferably, constituted by fluorescent tubes.

In order to render more apparent the technical features and advantages of the present invention, an embodiment thereof will now be described, it being well understood that this embodiment is in no way limitative as to its putting into practice and to the applications that can be made thereof.

DESCRIPTION OF THE DRAWING

The single appended FIGURE which represents an axial schematic cross-section of an illumination-bridge housing assembly to the embodiment of the invention.

DESCRIPTION OF THE PREFERRED EMBODIMENT

The upper plate of the copier is designated reference number 1 and only its portion adjacent to the devices according to the invention is represented, the remainder of the copier can be, as has been set out above, of any type for circulating the original document and the image support (intermediary or ultimate), and this by picture taking and line by line reproduction.

This plate is bored with a rectangular window 2 closed by a glass plate or equivalent 3 against the upper surface of which will slide the original document. This plate and the corresponding window have a length (perpendicular to the figure plane) at least equal to the width of passage of the original document (which can be its own width or length according to the apparatus and the formats). Plate 3 can be slightly bevelled and projecting from the upper face of plate 1 in order to ensure a good contact plane with the original document. It is mounted by any adequate means, for example, by wedging of one end, stapled to the other end.

Under window 2 and coaxially to it, is mounted illuminating housing 4 by any adequate means (not represented). This housing 4 presents a central chamber 5 for the optical portion per se and two lateral chambers 6 and 7 insulated from the central chamber by walls 8 and 9 of housing 4. The assembly extends substantially along the same length as window 2, i.e. at least the width of passage of the original document. In central chamber 5, are disposed two fluorescent tubes 10 and 11 or any suitable illuminating means. These tubes 10 and 11 are preferably provided with reflectors 12, 13 orienting the light towards window 2 and plate 3, i.e. towards the original documents pressed against this plate and sliding it in translation.

Between the two tubes lines, is disposed along the length of one line having the same length as the remainder of the device, the end of an assembly of optical fibres schematically designated by reference numeral 14 the other end faces the image support (intermediary or ultimate) which is not represented on the FIGURE. The assembly of optical fibres 14 is maintained in position in the device forming the light-proof joint 15. Housing 4 and, in particular, its central chamber 5 are mounted under plate 1 so as to prevent any light leakage towards the inside of the apparatus.

In lateral chambers 6 and 7, are mounted in rotation driving rollers 16 and 17 formed by a metallic axle and a long belt made of rubber or equivalent flexible material or again of a series of short belts separated by gaps. The assembly extends substantially along the same length as that of the housing and tubes since the function of the rollers is to drive the original document in translational movement. The rollers slightly extend beyond the upper face of plate 1 bored with openings 18, 19 corresponding to the outline of the rollers. The openings have a generally rectangular form surrounding each of the successive short rollers. The rollers are driven in rotation by devices of any convention type (not represented).

The illuminating housing is formed at its ends but is, however, bored in such a way as to be as light-proof as possible for connecting the tubes, their extraction and the driving of the rollers being, for example, integral with the external sealing stops of the illuminating housing.

The assembly is mounted upon a bridge formed essentially by a protective cover 20 and an outlet deflector 21 in order to disengage the original documents circulating in the direction of the arrow.

This bridge, like the illuminating housing, can be moulded from a single piece, for example, made of plastic or a light alloy material, especially aluminum.

The length of the bridge is greater than the width of passage of the original documents that penetrate opening 22 to issue through opening 23, by going back under the effect of deflector 21. The ends of the bridge rest upon the upper face of plate 1 and the whole is fixed to this plate, for example, by hooks such as 24 and 25 penetrating openings 26 and 27 during the putting into position in order to be wedged against abutments 28 and 29 under the lateral action of springs 30 and 31, schematically and partially represented, fixed by any suitable means to the body of the apparatus or plate 1.

In the bridge, are provided three chambers separated by walls 32 and 33 which are approximately opposite facing, for central chamber 34, that 5 of the illuminating housing and, for end chambers 35 and 36, those 6 and 7 of the said housing. In the end chambers, are mounted rollers 16 and 17 of the housing with which they cooperate.

They are loose and preferably they are permitted, by any adequate conventional means (not represented for enhanced simplicity) to be displaced from bottom to top of the FIGURE, urged towards the bottom by return spring 39 fixed at its centre to a block 40 forming part of the bridge, and this by any suitable means.

A plaquette 41, preferably smooth and of inactinic or white color, is also fixed to the bridge by any appropriate means such as by screwing. This plaquette guides the original document against glass plate 3. Its edges 42 and 43 are turned up and extended, where necessary, by teeth penetrating the intervals or gaps in the case of series of short rollers, which can thus ensure the maintenance in place of the rollers.

Deflector 21 is preferably extended by a series of teeth 44 penetrating the hollows corresponding to plate 1, in order to prevent the original document from being jammed under the lower portion. Thus, rollers 16 and 37, on the one hand, and rollers 17 and 38, on the other hand, are urged towards each other, the rotation of rollers 16 and 17 driving that of counter-rollers 37 and 38.

If a sheet is introduced into 22, it is guided between rollers 16 and 37, for example, by means of a series of teeth 45 then between glass plate 3 and plaquette 41. There, it will be illuminated by tubes 10 and 11 and the lines will be successively read by the assembly of optical fibres 14, the original document thereafter passing between rollers 17 and 38 in order to issue through 23 guided towards the top by deflector 21.

It is appropriate to mention that generally as in the majority of copiers, an adjustment knob is provided in the side and upper face of plate 1 in order to guide the original document and prevent presenting it obliquely at the inlet of the bridge. In order to simplify explanations, this conventional device has not been represented on the figure. Deflector 21 is not indispensable and it is obviously possible to allow the sheets to issue on plate 1.

Due to the fact that the bridge can be easily disassembled by pulling it slightly towards the left hand side on the figure against the urging of the springs 30 and 31 and by raising it vertically, it is possible thereby to pass to the upper surface a stiff and/or thick document, provided that pressure is applied to rollers 16 and 17 and the document is guided along the length of the above-mentioned slide-bar.

It is also possible to foresee, in plate 1 at inlet 22, a luminous slit which remains a light during the picture taking cycle and shuts off one an original document has left the central zone of the bridge and the housing. This allows the operator awaiting the off signal of the light to introduce an original document only once that the apparatus has returned to the beginning of the cycle, thereby avoiding a wedged copy risking being incomplete.

This lamp can be controlled from sensors detecting the passage of a perforation provided at the edge of the photoreceptor belt.

It is well understood that the present invention is in no way limited to the embodiment described and represented herein-above, but can be adapted to numerous variants available to the man skilled in the art without departing from the scope and spirit of the said invention.

I claim:

1. A photocopier for the line-by-line copying of a document, comprising:
   a body having an upper plate;
   a substantially linear array of optical fibers disposed along the length of the picture-taking line;
   a light-proof housing disposed in said body, said housing comprising first and second lateral chambers, first and second light-proof walls separating said first and second lateral chambers, respectively, from said central chamber, a central chamber intermediate said lateral chambers, and a light-proof lateral joint disposed beneath said central chamber, said array of optical fibers being maintained in position with the upper end thereof extending laterally into the bottom of said central chamber by said lateral joint;
   a substantially planar plate transparent disposed in said upper plate and covering said central chamber;
   first and second tubular illuminating assemblies disposed in said central chamber on either side of said array of optical fibers; and
   first and second driving rollers disposed in said first and second lateral chambers, respectively, said rollers being insulated from said array of optical fibers and tubular illuminating assemblies by said light-proof walls.

2. The photocopier of claim 1, further comprising dismountable bridge means disposed above said upper plate for driving the document across said driving rollers and said transparent plate, said bridge means comprising:
   a cover;
   plaquette means attached to said cover for applying the document against said transparent plate;
   first and second driven rollers disposed in said cover for cooperation with said first and second driving rollers, respectively; and
   engagement means attached to said bridge for releasably engaging said upper plate, whereby said bridge means can be completely dismounted from said upper plate.

3. The photocopier of claim 1, further comprising first and second reflector means disposed around said first and second tubular illuminating assemblies, respectively, for orienting the light from said tubular illuminating assemblies toward said transparent plate.

* * * * *